(12) United States Patent
Aftosmis et al.

(10) Patent No.: US 6,445,390 B1
(45) Date of Patent: Sep. 3, 2002

(54) TRIANGLE GEOMETRY PROCESSING FOR SURFACE MODELING AND CARTESIAN GRID GENERATION

(75) Inventors: Michael J. Aftosmis, San Mateo; John E. Melton, Hollister, both of CA (US); Marsha J. Berger, New York, NY (US)

(73) Assignee: The United States of America as represented by the Adminstrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/226,673

(22) Filed: Dec. 24, 1998

Related U.S. Application Data

(60) Provisional application No. 60/068,846, filed on Dec. 29, 1997.

(51) Int. Cl.[7] ............................................... G06T 15/40
(52) U.S. Cl. .................... 345/421; 345/420; 345/423
(58) Field of Search ............................... 345/420, 421, 345/424, 423

(56) References Cited

U.S. PATENT DOCUMENTS 5,522,019 A * 5/1996 Bala et al. .................. 345/424

OTHER PUBLICATIONS

Sugihara "An Intersection Algorithm Based on Delaunay Triangulation", IEEE, Mar. 1995, pp. 59–67.*
Agrawala et al. "3D Painting on Scanned Surfaces", ACM Apr. 1995, pp. 145–150.*
Livnat et al. "A Near Optimal Isosurface Extraction algorithm Using the Span Space", IEEE, 1996, pp. 73–84.*
Aftosmis, M.J., "Emerging CFD Technologies and Aerospace Vehicle Design," NASA Wkshp .on Surf. Mod., Grid Gen., and Related Issues in CFD, NASA Lewis Rsch Cntr., May 9–11, 1995.
Aftosmis, M.J., Melton, J.E., and Berger, M.J., "Adaptation and Surface Modeling for Cartesian Mesh Methods," AIAA Paper 95–1725–CP, Jun., 1995.

* cited by examiner

*Primary Examiner*—Mark Zimmerman
*Assistant Examiner*—Kimbinh T. Nguyen
(74) *Attorney, Agent, or Firm*—Robert M. Padilla; Kenneth L. Warsh

(57) ABSTRACT

Cartesian mesh generation is accomplished for component based geometries, by intersecting components subject to mesh generation to extract wetted surfaces with a geometry engine using adaptive precision arithmetic in a system which automatically breaks ties with respect to geometric degeneracies. During volume mesh generation, intersected surface triangulations are received to enable mesh generation with cell division of an initially coarse grid. The hexagonal cells are resolved, preserving the ability to directionally divide cells which are locally well aligned.

35 Claims, 5 Drawing Sheets

TRIANGLE GEOMETRY PROCESSING FOR SURFACE MODELING AND CARTESIAN GRID GENERATION

This application claims the benefit of provisional application No. 60/068,846, filed Dec. 12, 1997.

ORIGIN OF INVENTION

The invention described herein was made by an employee of New York University and employees of the United States Government and may be manufactured and used by or for the Government for governmental purposes without payment of any royalties thereon or therefor. The invention described herein was made in the performance of work under Air Force Office of Scientific Research (AFOSR), Department of Energy (DOE), and NASA contracts and is subject to the provision of Section 305 of the National Aeronautics and Space Act of 1958, Public Law 85-568 (72 Stat. 435; 42 U.S.C. Section 2457).

FIELD OF THE INVENTION

This invention relates to computer technology and, in particular, to computer applications for processing of triangulated surfaces and Cartesian mesh generation.

BACKGROUND OF THE INVENTION

Adaptive Cartesian mesh solutions have been attempted for problems involving complex geometries. Flow solvers and mesh generation schemes for use with arbitrary geometries have been sought. Some approaches have included beginning with a surface triangulation constrained to the intersection curves of particular components. In contrast, a component based approach requires that each element of a geometry be described as a single closed entity. However, using the component based approach adds complexity during grid generation. Since components may overlap, Cartesian cell surface intersections must be characterized and those internal to components must be rejected. Such rejection filtering increases complexity. Assembling surface geometries and creating volume grids on a computer (for example, for computational physics simulations) is accordingly a difficult and time-consuming process. Thus, there is a need to improve accuracy and efficiency of the computerized surface creation, component definition, and volume mesh generation. It is desirable that an automatic method for discretizing the domain around arbitrarily complex geometries be accomplished.

SUMMARY OF THE INVENTION

According to the present invention, computer techniques for processing of triangulated surface geometry and Cartesian mesh generation is made particularly robust and efficient. In particular according to the present invention, complex two and three dimensional computer configurations are produced from combinations of simpler components. Portions of components that lie inside of other components are automatically trimmed away according to the present invention, leaving only the external (exposed) portions of the selected component collection. The intersections between components are accurately expressed in the resultant triangulation.

According to one embodiment of the present invention, geometric degeneracies (tie breaking) are unambiguously resolved. Efficient data structures are selectively stored in computer memory, and specialized techniques, including those from computational geometry and computer graphics, are used to generate a body-intersecting Cartesian volume mesh that discretizes the surrounding flow field.

According to the present invention, the creation of complex surface definitions is simplified. Further according to the present invention, selected complex surface definitions are made accurate and precise to a degree not known in the prior art. Accordingly, accurate computational aerodynamic performance estimation is facilitated. Additionally, Cartesian grid generation is made more effective. More specifically, the computer system according to the present invention forms the Boolean union of multiple-component geometries, and eliminates selected portions of the assembled geometry that are within the assembled geometry and thus hidden from exterior view. According to the present invention, computations of surface-related quantities are computed with increased accuracy, enabling the effective production of data images describing features such as for example, without limitation, the exposed surface area and the internal volume of a selected structure, to produce a structure descriptive information dataset representing processed surface data. The processed surface data is then provided to the volume mesh generator for further computation. A surrounding flowfield for the selected structure is automatically discretized into rectangular hexahedra (cells), with the size of the hexahedra being reduced in areas of large surface curvature or strong flow field gradients. Cells that are split into multiple distinct and unconnected regions by thin pieces of the surface are identified, and the individual regions are marked and saved in the computer memory for use, for example, in flow field simulations. According to the present invention, a Cartesian mesh generation system is provided that is capable of identifying and correcting cells that are split into distinct, unconnected regions. For example and without limitation, the disclosed technology may be employed for applications that include aerodynamic performance estimation and optimization for ground and aerospace vehicles; computer-based geometry modeling (CAD/CAM) systems; rapid prototyping systems (sterolighography); computer-based visualization systems (medical, chemical, and other imaging); computational physics modeling systems (CEM/CFD, etc.); semiconductor device modeling; and internet and data transfer applications (including substantial reductions in the size of VRML and other geometry-related datasets).

DETAILED DESCRIPTION OF A PREFERRED MODE

Figure 1:
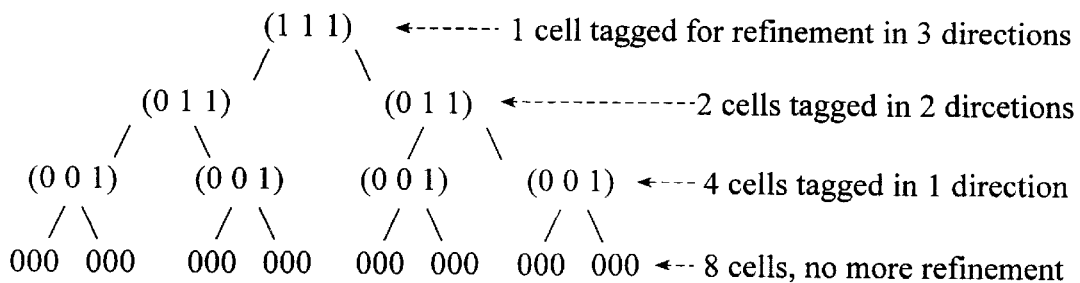
FIG. 1 is a diagram of a refinement tree according to one embodiment of the present invention.

FIG. 1 is a diagram of a refinement tree according to one embodiment of the present invention. The disclosed embodiments are implemented by software running preferably on general purpose computer hardware. For example, the disclosed system may employ hardware available in typical workstations and servers, such as an SGI (Indigo, Onyx and Origin2000) or SUN (Sparc/Ultrasparc) desktop machine. The present invention may also be implemented on a computer such as Cray C90. Alternatively, the system and method of the present invention may also be implemented to run on a Pentium PC hardware system. According to one embodiment of the present invention, bitmasks are used for uniquely locating/constraining points/faces/edge/corners on a cell. In particular, three dimensional points associated with each Cartesian cell are assigned a boolean code with a length equal to 2 times the number of dimensions of the cell (in 3D, there are 6 bits, similar to the OUTCODE). This bitmask is used to uniquely constrain the location of the 3D points to certain parts of the Cartesian cell. Points within the cell are assigned a Zero. The six positions for this bitmask for 3D Cartesian cells are:

(Low_X, High_X, Low_Y, High_Y, Low_Z, High_Z)

Figure 2A:
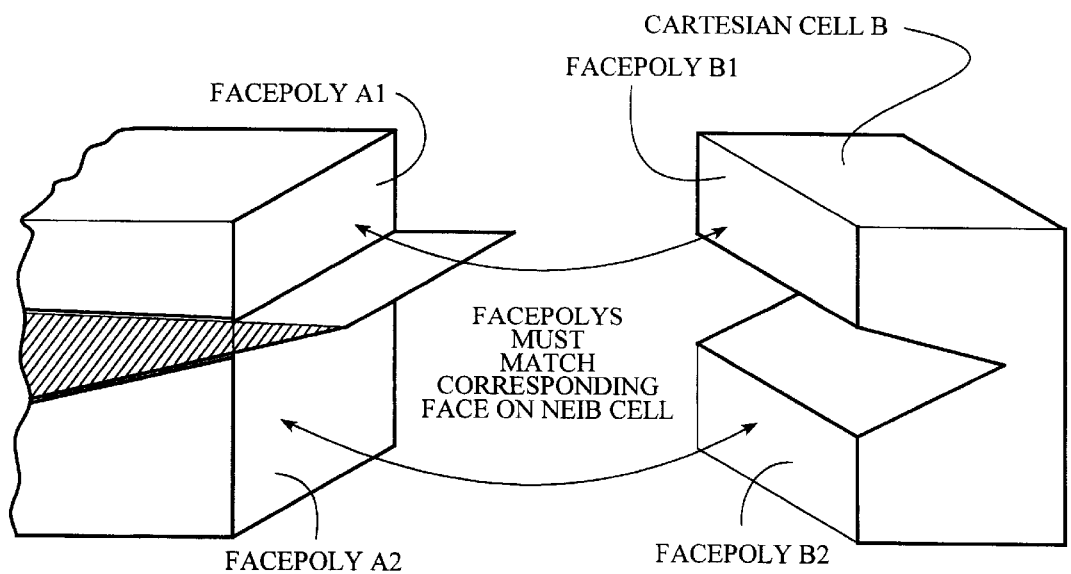
FIG. 2a is a diagram of a method according to the present invention for dividing a single cell of a selected structure into multiple polyhedra by intersected geometry techniques.

If a 3D point is "ON" (constrained to) a face of the cell, the corresponding bit is set to "1" otherwise it is set to "0". Points ON edges of the cell may be thought of as being "ON" two faces of the cell, and therefore, they will have 2 bits set. For example, if a point has its Low_X and Low_Y bit set, then that point must lie precisely ON the edge formed by the Low_X and Low_Y faces of the Cartesian cell. Similarly points constrained to the corners of the Cartesian cell have 3 bits set, since at cell corners, three faces share a common point. 3D points interior to the cell have no bits set. Therefore, the number of bits set in this mask uniquely distinguish points that lie on edges, on faces, or on corners of the Cartesian cell. The positions of the bits which are set further classify the location of the 3D points with respect to the cell. This system of classification makes it possible to rapidly compare locations of objects, and to do constrained comparisons, such as intersection testing of two line segments which are constrained to a Cartesian cell face. This classification frequently permits intersection testing to be carried out in lower dimensions. According to one embodiment of the present invention, bitwise tags are used for directional refinement. In particular, Cartesian cells are refined or divided in any combination of Cartesian directions. For example, a Cartesian cell may be divided in one direction (i.e., X, Y, or Z only), which would partition the original parent cell into 2 children. In other instances, a cell may require refinement into two directions (i.e. X&Y, X&Z, or Y&Z). Division into two directions splits a single parent cell into 4 children. Finally, a cell may be divided in all three directions, X, Y, and Z. Such a cell would produce 8 children cells after division. To specify the division required according to cell, a 3 bit code is used, with each bit corresponding to division in a Cartesian direction. Any bit ordering convention would work, but take for example (bit_X,bit_Y, bit_Z). A set bit indicating division in that direction is accordingly required. The code (1 0 0) thus signifies that the cell is to be divided in X only (with two children cells). Similarly, the code (1 0 1) would indicate division is required in X and Z directions (with 4 children cells). A code of (1 1 1) uniquely specifies a single parent cell. When cell division occurs according to the present invention, it occurs on a direction-by-direction basis. At the time of division, the bit for the current division gets unset (assigned a value of "0"). After a cell is divided, its code is inherited by its children. Thus, if a cell is initially tagged with a code (1 1 1), it is divided in X. This unsets the X bit, and the remainder of the code is inherited by the two children. Each of these new children are tagged for refinement in both Y and Z, and they accordingly have codes (0 1 1). After each of these cells are divided next in Y, there will be 4 children, and each of these inherits a code of (0 0 1), implying that there is still a division in Z remaining. After division in Z is complete, there will be 8 children cells, and each will have a code of (0 0 0) indicating that refinement is complete. The refinement tree according to the present invention is illustrated in FIG. 1. Each refinement according to the present invention constitutes a simple binary partition of the cell. Thus, the refinement is implemented with a single cell division algorithm which splits a cell into two children. According to the present invention, split cells of adjacent polyhedra are matched by testing Cartesian edge fragments for overlap. A single Cartesian cell is accordingly divided into several polyhedra by intersected geometry (see cell A in FIG. 2a). When this occurs, a face (which is a polygon) on the original "facepoly A1" corresponds to a "facepoly A2" in FIG. 2a. The face polygons one each cell accordingly have corresponding polygons on the neighboring cell (cell B in FIG. 2a). However, when a cell A is split into multiple polyhedra by the intersected geometry, the correspondence of its face polygons with those of its neighboring cells may be lost. This is a specific case of "polygon matching." According to this process, two-dimensional polygons (facepolys like A1, A2, B1, B2 are planar and therefore may be constructed in two spatial dimensions only) are matched with corresponding two dimensional polygons on abutting polyhedra in three dimensional space. Polygon matching is performed according to the present invention during Cartesian mesh generation in operations not only for processing split cells, but also during mesh refinement boundary processing. Thus, according to the present invention, an intersection test for two planar polygons which exist in a three dimensional domain is performed. Floating point inaccuracy makes typically employed algorithms problematic to implement robustly for such operations. Furthermore, all of the points which lie on Cartesian edges or lie on the faces of the Cartesian cell are "constructed" geometry, and are therefore subject to round-off error from their construction using floating-point math. Such difficulties eliminate the approach of trying to match points within one polygon with points within the other, or casting a ray from within one polygon and seeing if it intersects the boundary of the other. The approach according to the present invention thus simplifies into a matching test in a single dimension. Polygons are therefore processed by matching segments of their edges which are coincident with edges of the Cartesian cell of interest. The bitmasks employed for the vertices of the polygon being processed make it possible to unambiguously identify which polygon edges are coincident with particular edges of the Cartesian cell. When the bitmasks indicate that an edge of a polygon A is constrained to the same Cartesian edge as an edge of a polygon B, there is accordingly a possibility that polygon A matches polygon B. Constraining to the Cartesian edge removes two coordinate directions from the overlap test, and there is only one dimension left to check for a match. Therefore, matching the face polygons of one cell with the corresponding face polygons of another cell reduces to an overlap test of two line segments which are constrained to an edge of a Cartesian cell. Furthermore, this 1-D test is robust, since non-matching polygons will occupy no overlapping segments of the Cartesian edge.

Figure 2B:
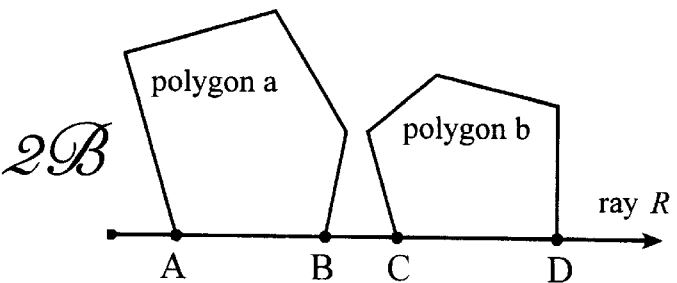
FIG. 2b is a diagram of a method for polygon matching.

FIG. 2B illustrates an algorithm according to one embodiment of the present invention, for accomplishing polygon matching. In particular, the bitmasks of a polygon_a and a polygon_b determine that edge AB of polygon a and the edge CD of polygon_b lie along the same ray. Furthermore, in the 2D plane defined by the polygons, both polygon_a and polygon_b lie above that ray. Thus, if the edge AD overlaps with the edge CD, the polygons intersect. This procedure is also used for matching faces of surface intersecting cells at refinement boundaries, and for split-cells at refinement boundaries.

Figure 3A:
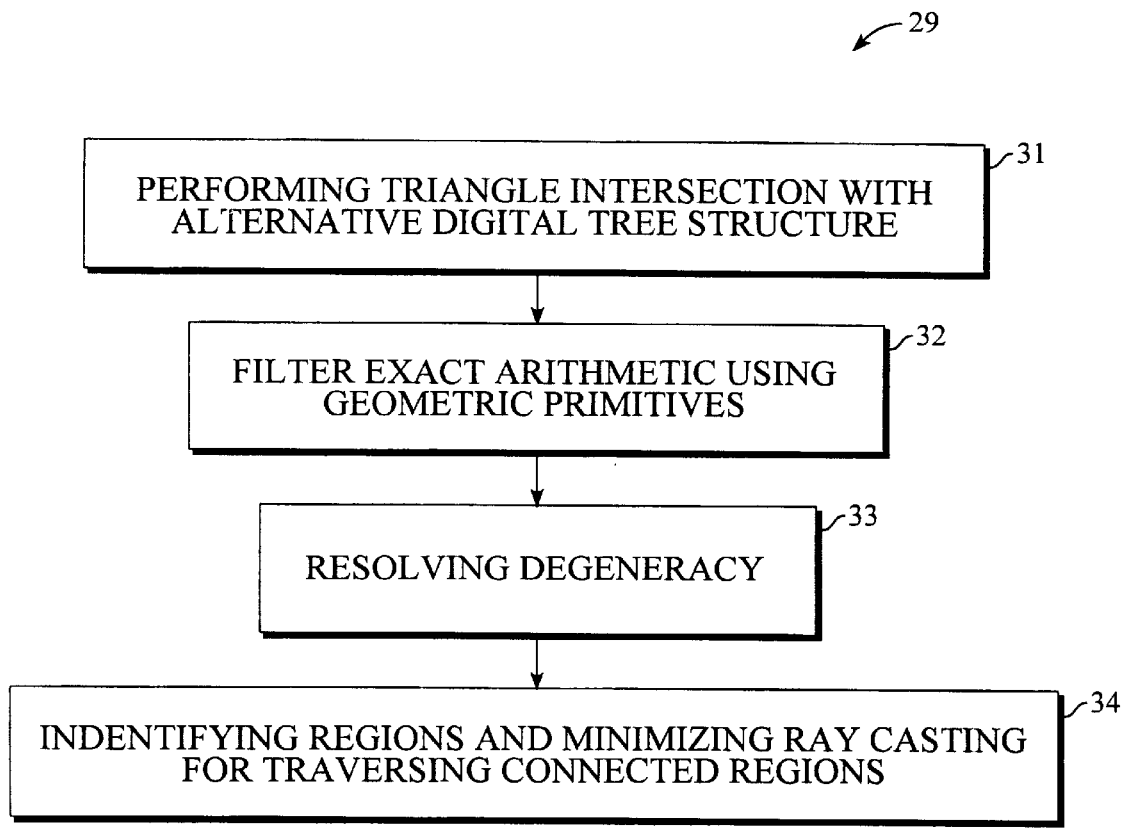
FIG. 3A is a flow chart of a method of intersection determination according to one embodiment of the present invention.

FIG. 3A is a flow chart of a method of component intersection determination 29 according to one embodiment of the present invention. In particular, component intersection determination 29 includes the processing of triangulated surface geometries by locating 31 triangle intersection candidates with an alternating digital tree (ADT) data structure or use of another spatial data structure such as for example a binary tree, a K-d tree, a regional quad/octree, a bucket quad/octree, a range tree, a Kdb-tree, an R-tree, an hB tree, an MX tree, a bin tree, a sector tree, a 2n-tree, sequential and inverted lists, and linear trees as well as other techniques as described in Samet, H., *The Design and Analysis of Spatial Data Structures, Addison-Wesley Series on Computer Science and Information Processing*; Addison-Wesley Publishing Company, (1990), according to the present invention. Use of the ADT data structure enables implementation of a proximity query according to the present invention, in which a list of candidate triangles is reduced, saving considerable processing time. The ADT is a hyperspace search technique which converts the problem of searching for finite sized objects in d dimensions to the simpler one of partitioning a space with 2d dimensions. Since the searches are not conducted in physical space, objects which are physically close together are not necessarily close in the search space. Accordingly, to improve lookup times, a component bounding box filter is applied to the triangles before inserting them into the tree. Triangles which are not in the bounding box of a component other than its own, are not inserted into the tree. This filtering technique not only reduces the tree size, but also improves the probability of encountering an intersection candidate within the tree, since the ADT data structure is not crowded with irrelevant geometry. The component intersections which are actually checked according to the present invention are only those relating to candidate triangles from the list of spanning triangles returned from the tree. With the task of intersecting a particular triangle reduced to an intersection test between that triangle and those on the list of candidates provided by the ADT, the intersection determination according to the present invention reduces to a series of triangle to triangle intersection determinations. According to the present invention, each intersecting triangle to triangle pair contributes a single segment to the final polyhedra that will comprise the wetted surface of the particular configuration being evaluated. Triangle to triangle intersections according to the present invention are determined by a Boolean logic check. For two triangles to intersect in three dimensional space, two edges of one triangle must cross the plane of the other triangle, and there must be two pierced triangle edges. The Boolean logic check according to the present invention includes determination of a triple product without division. More particularly, the Boolean primitive for the 3D intersection of an edge and a triangle is based upon the signed volume of a tetrahedron in $R^3$ which is defined by a segment intersecting a triangle, which can be determined by evaluating the determinant of the following matrix:

$$\begin{bmatrix} a_0 & a_1 & a_2 & 1 \\ b_0 & b_1 & b_2 & 1 \\ c_0 & c_1 & c_2 & 1 \\ d_0 & d_1 & d_2 & 1 \end{bmatrix}$$

where a, b, c, and d are the vertices of the determinant, and a0, a1, and a2 are the coordinates of the vertex a; b0, b1, and b2 are the coordinates of the vertex b; c0, c0, and c2 are the coordinates of the vertex c; and d0, d1, and d2 are the coordinates of the vertex d of the tetrahedron being evaluated. The determinant is positive when points a, b, and c are arranged in a counterclockwise circuit on a plane viewed from a point d. Positive and negative volumes define the two states of the Boolean test, while zero indicates that the points a, b, c, and d are coplanar. If the vertices are coplanar, this constitutes a "tie" which is resolved with a tie-breaking algorithm according to the present invention. A linked list is produced of all segments identified which result from intersections between triangle to triangle pairs. The pierce points at which the segments intersect the triangles are then determined conventionally. The intersecting segments divide the intersected triangles into polygonal regions which are either inside or outside the component body subject to operation. The portions of the polygon which are inside the body are triangulated, and the triangles which lie inside the body are rejected. According to one embodiment of the present invention, a well known two dimensional Delaunay algorithm is used within each original intersected triangle. Next, the results of the exact arithmetic are filtered 32 using geometric primitives to determine whether a particular triangle is internal to the wetted surface of a body configuration being evaluated and is to be deleted. Deletion of triangles which are internal to the configuration is accomplished according to the present invention, by ray casting. It is determined whether a point is within a particular component of a selected configuration if a ray cast from the point intersects the closed boundary of the configuration an odd number of times. Ray casting according to the present invention is accomplished with a Boolean operation. Counting the number of intersections determines a triangle's status as inside or outside. According to the present invention, the status of a tested triangle as inside or outside is passed on, i.e., painted, onto each of the three adjacent triangles sharing its edges. This passing of status propagates until a constrained edge is reached. According to one embodiment of the present invention, the painting is implemented with a stack, to avoid the overhead associated with recursion. Then, degeneracies are identified and resolved 33. A degeneracy is defined as an outcome from determinant evaluation which exactly equals zero, in connection with ray casting degeneracies and during Boolean triangle-to-triangle intersection determination. Once a degeneracy has been determined, an adaptive precision, floating point filtering and virtual perturbation technique according to one embodiment of the present invention is implemented. Accordingly, the determinant evaluation cases are established to segregate cases in which exact determinant evaluation is unnecessary, because the determined evaluation calculation produces a result which is greater than the error bound established for determinant evaluation. If the determinant evaluation results in a value which is less than the error bound, then the result cannot be relied upon, and the exact arithmetic evaluation calculation needs to be undertaken. The identification of degeneracies, in which its is unclear whether a point, i.e., a triangle vertex, is within or outside of a configuration, is determined according to the present invention, by evaluating the determinant representing the volume of a tetrahedron defined by a point off a plane surface holding a triangle intersected by a segment from the point being evaluated, with a floating point calculation and comparing the results of the calculation with an error bound for the floating point calculation, as per an adaptive precision exact arithmetic procedure developed by Shewchuk, J. R. See his article "Adaptive Precision Floating-Point Arithmetic and Fast Robust Geometric Predicates." CMU-CS-96-140, School of Computer Science, Carnegie Mellon Univ., 1996. If the error bound exceeds the volume determined by floating point calculation, then the result is degenerate, meaning that the point being evaluated is substantially present on the surface of the configuration subject to evaluation. When a degenerate geometry is identified by the exact arithmetic approach just indicated, a simulation of simplicity approach is undertaken to apply a virtual perturbation to break a tie which placed the point under evaluation substantially on the surface of the configuration being evaluated. Accordingly, final triangulated wetted surface regions are identified 34, and ray casting is minimized by restricting ray casting to a predetermined bound or region.

Figure 3B:
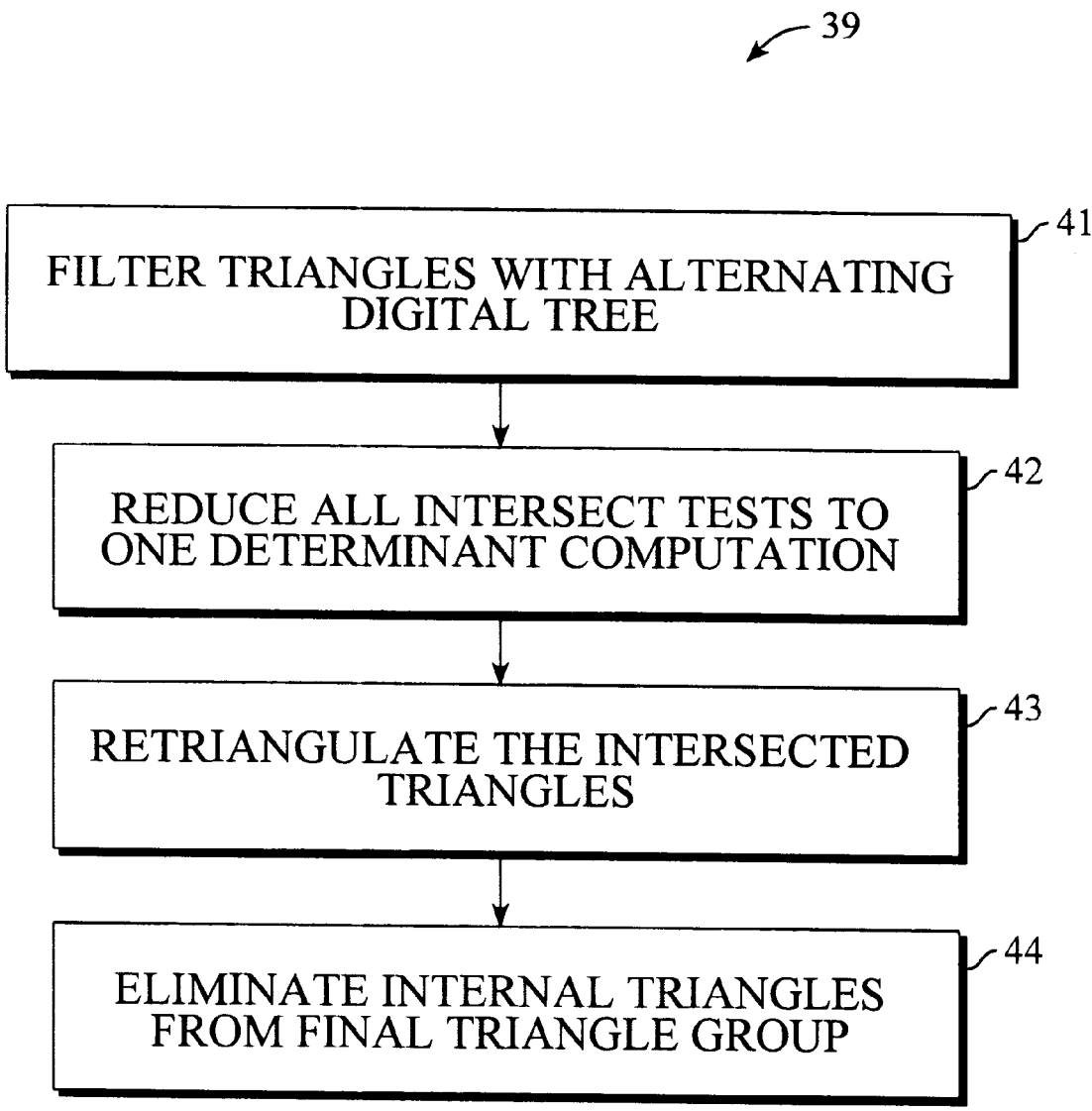
FIG. 3B is a flow chart of a method of intersection determination according to another embodiment of the present invention.

FIG. 3B is a flow chart of a method of intersection determination according to another embodiment of the present invention. In particular, FIG. 3B is a flow chart of a method of component intersection determination 39 according to one embodiment of the present invention. The component extraction method according to the present invention permits robust extraction of a resultant wetted surface from a plurality of intersected components. In particular, component intersection determination 39 includes the filter processing, i.e., filtering, of triangulated surface geometries by performing triangle intersection 41 subject to use of an alternating digital tree (ADT) data structure, according to the present invention. Performance of triangle intersection 41 includes determination of which triangles are candidates for intersection. Each component surface has been pre-triangulated, and the intersection of multiple pre-triangulated component surfaces produces a single wetted surface comprising subsets of triangles from the respective original component surfaces and additionally new triangles from triangulation operations, according to the present invention. ADT filtering of triangles permits identification of which triangles of the original component surfaces are relevant to the establishment of new triangulations (i.e., retriangulations of intersected triangles of intersecting component surfaces) for the combined wetted surface. The triangles are filtered according to one embodiment of the present invention with a ADT data structure which enables implementation of a proximity query according to the present invention. Accordingly, the triangle filtering permits the combined list of candidate triangles from intersected components to be reduced, saving considerable processing time in the determination of which component triangles are actually intersecting. The ADT method is a hyperspace search technique which converts the problem of searching for finite sized objects in d dimensions to the simpler one of partitioning a space with 2d dimensions. Since the searches are not conducted in physical space, objects which are physically close together are not necessarily close in the search space. Accordingly, to improve lookup times, a component bounding box filter according to the present invention is applied to the triangles before inserting them into the tree for analysis. Triangles which are not within an established bounding box of a component other than its own, are not inserted into the tree for further processing. This filtering technique not only reduces the tree size, but also improves the probability of encountering an intersection candidate within the tree, since the ADT data structure is not crowded with irrelevant geometry elements. The component intersections which are actually checked for intersection of triangles, according to the present invention, are only those candidate triangles from the list of spanning triangles, which are returned from the tree analysis. Thus, the task of intersecting a particular triangle is reduced to an intersection test between that triangle and those other triangles on the list of candidates provided by the ADT, and the intersection determination according to the present invention reduces to a series of triangle-to-triangle intersection determinations. According to the present invention, each intersecting triangle-to-triangle pair contributes a single segment to the final polyhedra that will comprise the ultimate desired wetted surface of the particular configuration being evaluated. Triangle-to-triangle intersections according to the present invention are determined by a Boolean logic check. For two triangles to intersect in three dimensional space, two edges of one triangle must cross the plane of the other triangle, and there must be two pierced triangle edges. The Boolean logic check according to the present invention includes determination of a triple product without division. More particularly, the Boolean primitive for the 3D intersection of an edge and a triangle is based upon the signed volume of a tetrahedron in $R^3$ which is defined by a segment intersecting a triangle, which can be determined by evaluating the determinant of the following matrix:

$$\begin{bmatrix} a_0 & a_1 & a_2 & 1 \\ b_0 & b_1 & b_2 & 1 \\ c_0 & c_1 & c_2 & 1 \\ d_0 & d_1 & d_2 & 1 \end{bmatrix}$$

where a, b, c, and d are the vertices of the determinant, and a0, a1, and a2 are the coordinates of the vertex a; b0, b1, and b2 are the coordinates of the vertex b; c0, c1, and c2 are the coordinates of the vertex c; and d0, d1, and d2 are the coordinates of the vertex d of the tetrahedron being evaluated. Next, the results of the exact arithmetic are filtered 32 using geometric primitives to determine whether a particular triangle is internal to the wetted surface of a body configuration being evaluated and is to be deleted. Deletion of triangles which are internal to the configuration is accomplished according to the present invention, by ray casting. It is determined whether a point is within a particular component of a selected configuration if a ray cast from the point intersects the closed boundary of the configuration an odd number of times. Ray casting according to the present invention is accomplished with a Boolean operation. Counting the number of intersections determines a triangle's status as inside or outside. According to the present invention, the status of a tested triangle as inside or outside is passed on, i.e., painted, onto each of the three adjacent triangles sharing its edges. This passing of status propagates until a constrained edge is reached. According to one embodiment of the present invention, the painting is implemented with a stack, to avoid the overhead associated with recursion. Then, degeneracies are identified and resolved 33. The identification of degeneracies, in which it is unclear whether a point, i.e., a triangle vertex, is within or outside of a configuration, is determined according to the present invention, by evaluating the determinant representing the volume of a tetrahedron defined by a point off a plane surface holding a triangle intersected by a segment from the point being evaluated, with a floating point calculation and comparing the results of the calculation with an error bound for the floating point calculation, as per an adaptive precision exact arithmetic procedure developed by Shewchuk, J. R. See his article "Adaptive Precision Floating-Point Arithmetic and Fast Robust Geometric Predicates." CMU-CS-96-140, School of Computer Science, Carnegie Mellon Univ., 1996. If the error bound exceeds the volume determined by floating point calculation, then the result is degenerate, meaning that the point being evaluated is substantially present on the surface of the configuration subject to evaluation. When a degenerate geometry is identified by the exact arithmetic approach just indicated, a simulation of simplicity approach is undertaken to apply a virtual perturbation to break a tie which placed the point under evaluation substantially on the surface of the configuration being evaluated. Accordingly, final triangulated wetted surface regions are identified 34, and ray casting is minimized by restricting ray casting to a predetermined bound or region.

Figure 4:
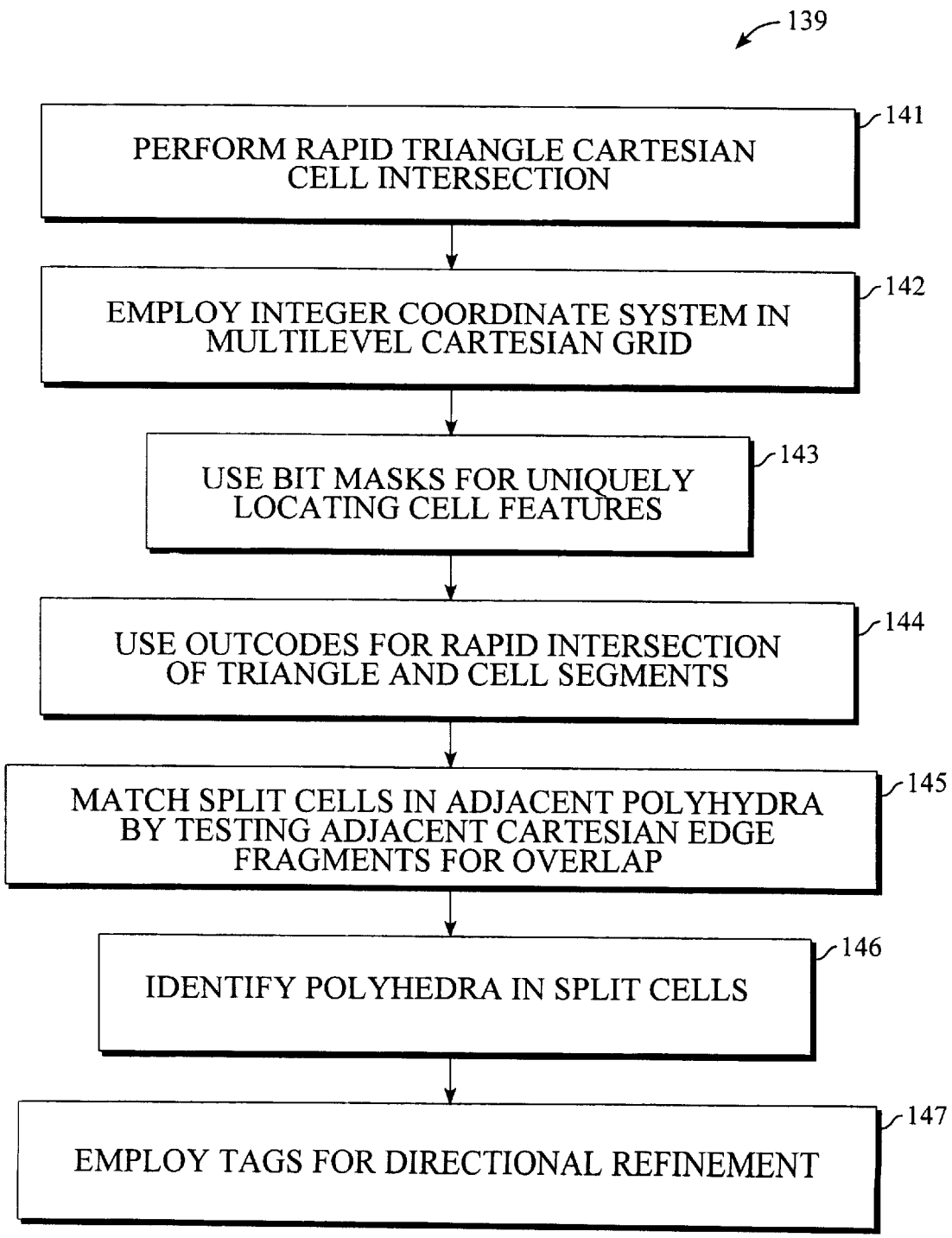
FIG. 4 is a flow chart of a method of grid generation according to one embodiment of the present invention.

FIG. 4 is a flow chart of a method of Cartesian volume mesh generation 139, beginning with final wetted surface triangulation, according to one embodiment of the present invention. In particular, mesh generation 139 includes proximity testing 140 of surface triangles from the final wetted surface triangulation, to enable determination of surface intersections with particular Cartesian cells. Initially, a predetermined number of surface triangles are inserted into an alternating digital tree (ATD) or using another spatial data structure such as for example a binary tree, a K-d tree, a regional quad/octree, a bucket quad/octree, a range tree, a Kdb-tree, an R-tree, an hB tree, an MX tree, a bin tree, a sector tree, a $2^n$-tree, sequential and inverted lists, and linear trees as well as other techniques as described in Samet, H., *The Design and Analysis of Spatial Data Structures, Addison-Wesley Series on Computer Science and Information Processing*; Addison-Wesley Publishing Company, (1990). The triangles are tested for intersection with Cartesian cells, and if an intersection is found, the cell is subdivided, with the child cells inheriting the triangle list of its parent. Initially, a cell will test for intersection with the entire list of triangles. A divided cell will only test for intersection with the triangles with which its parent cell had an intersection relationship, according to one embodiment of the present invention. The triangle lists connected to a surface intersection ("cut") Cartesian cell get shorter by approximately a factor of 4 with each subdivision. The Cartesian cells are subject to directional division for a predetermined number of times, beginning with an initially coarse grid of hexagonal cells. To establish whether a Cartesian cell is a candidate for division, the cell is tested for intersection with a plurality of points constituting vertices of triangles from the final wetted surface triangulation provided prior to mesh generation. Each vertex is assigned an outcode associated with its location with respect to a particular Cartesian cell, to enable a fast intersection test. Determination of rapid triangle Cartesian cell intersections with an integer coordinate system is accomplished 141 by cell division of intersected cells in a multilevel Cartesian grid 142. Surface intersecting Cartesian cells are automatically refined, i.e., divided, a predetermined number of times, and the refinement is propagated to neighboring cells by a paint operation. Further refinement includes curvature detection including detection of the angular variation of a surface normal. In particular, bitmasks are used 143 for uniquely locating cell features, and outcode data structures are used 144 for rapid intersection determination between selected triangles and cell segments. The outcodes are logically combined with AND and OR binary primitives, to determine whether a segment spanning the vertices represented by the respective outcodes intersects a cell boundary. Questionable bits are screened out before evaluation, and are not used for determining intersections. Then, split cells in adjacent polyhedra are matched 145 by testing adjacent Cartesian edge fragments for overlap. Thereafter, the polyhedra in split cells are identified 146, employing tags 147 for directional refinement.

Figure 5:
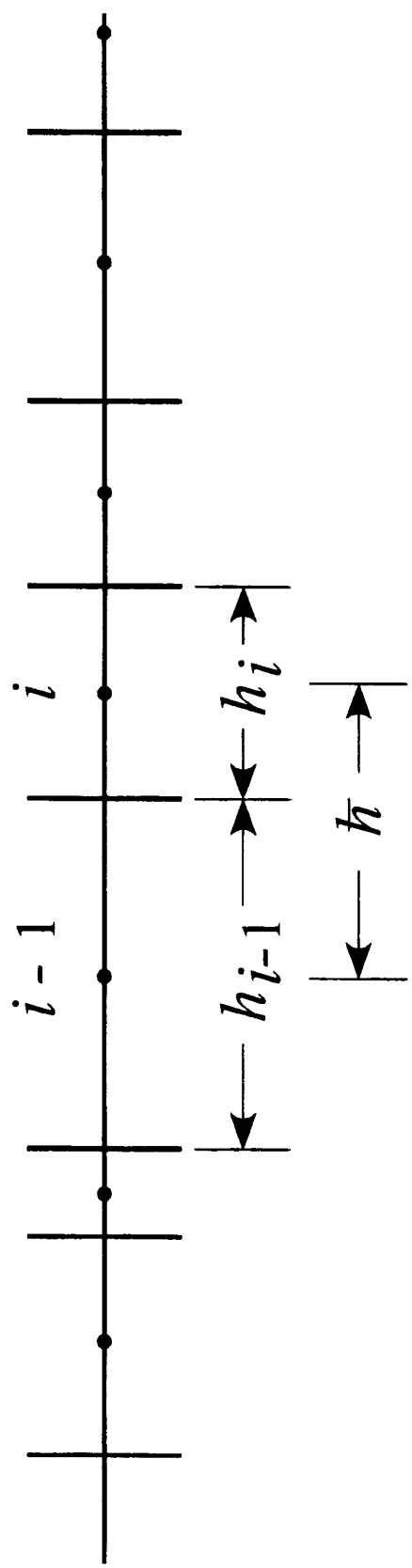
FIG. 5 is a diagram of nomenclature of a non-uniform mesh in 1-D.

FIG. 5 is a diagram of a non-uniform, one-dimensional mesh. In particular, there is shown an irregular one-dimensional mesh which can be represented mathematically according to well-known techniques. The present invention applies to single and multiple dimensional meshes and mesh representations. With such mesh schemes, it is possible to produce diagrams of a Cartesian mesh for an attack helicopter configuration and a close-up of the mesh through the left wing and stores. The present invention facilitates production of Cartesian mesh representations of structural configurations made of multiple components such as for example, without limitations, an attack helicopter and its structural components including wings and stores. With such mesh schemes, it is possible to produce diagrams of isobars resulting from inviscid flow analysis of an attack elicopter configuration determined on a mesh with 1.2M cells. The present invention facilitates production of Cartesian mesh representations of such configurations made of multiple components such as for example, without limitations, an attack helicopter and its structural components including wings and stores. With such mesh schemes, it is possible to produce a scatter plot of mesh size vs. computation time for a double-teardrop configuration. As shown, computation time increases linearly with the number of cells represented.

FIG. 1-5 of Appendix B are diagrams of an AMR mesh blocking for cells tagged around a circular region in 2D, respectively with cells tagged for refinement with patch outlines indicated by heavy lines, and according to a referenced sample calculation. In essence, AMR is a hierarchical inter-mesh communication scheme. It relies upon block-structured, locally refined mesh patches to increase the resolution of an underlying structured coarse grid. Mesh patches at different levels are stored in a tree-based hierarchy. The method begins with an estimate of the local truncation error within each cell of a coarse grid patch. Cells with high error are then tagged for later refinement. Rather than divide each individual cell, the tagged cells are organized into rectangular grid patches which usually contain hundreds to thousands of cells per patch. Accordingly, it is possible to produce a diagram of density contours for a time dependent shock reflection from a double ramp using AMR on Cartesian meshes, with mesh patch outlines being shown, according to the prior art. In particular, FIG. 6 shows an example of a 2-D time dependent double ramp AMR resolution.

FIG. 1-7 of Appendix B are respective diagrams of a parent-child relationship in a Cartesian mesh using a regional quadtree data structure, and a corresponding subtree and a scheme for array based storage. The Figure particularly shows an example of an ordering for a single parent node and its four children in a 2-D quadtree mesh. The quadtree shown is referred to as a regional quadtree, since each node in the tree corresponds to a region in the domain. Each node in the tree may be pointed to by only one parent node, and only the root has no parent. Leaf nodes are distinguished by the fact that they have no children. The Figure additionally shows a simple 1-D array-based storage scheme for mapping a regional quadtree tree to memory.

FIG. 1-8 of Appendix B are respective diagrams of a quadtree mesh, a regional quadtree structure and an array based storage scheme. In particular, the Figure shows a quadtree mesh with three levels of tree nodes and 10 leaf nodes for the cells in the computational domain.

FIG. 1-9 of Appendix B are respective diagrams of tree-traversal paths for locating the north face-neighbors of particular cells. This provides information about a cell's logical relationship to other cells in the domain. In particular, the FIG. 3 shows a cell-centered flow solver on a 2-D mesh. Cell-centered storage of state data implies that each cell will exchange flux with its nearest face neighbors. The tree structure is relatively compact, and provides virtually all mesh connectivity information, while permitting direct computation of geometric properties. Geometry and cell size need not be stored explicitly. Adaptation is relatively easy to implement, since the structure is extensible through division of leaf nodes. Accordingly, it is possible to produce a diagram of isobars and mesh cuts on a business jet configuration computed with an octree based approach according to the prior art. In particular, it is possible to produce flow examples computed with octree and quadtree meshes. The mesh-cut through the aircraft symmetry plane provides an indication of mesh resolution. It is further possible to produce diagrams of density contours and adapted quadtree grids showing time histories of projectile penetration, according to the prior art.

FIG. 1-13 of Appendix B are diagrams of prior art data structures for polyhedral tessellations in two and three dimensions. In particular, the Figure depicts common local data structures for describing mesh connectivity. One such structure lists cell-to-vertex connectivity of an element, or the cell-to-edge (i.e, cell-to-face) connections. The edges may be directed and may include links to cells on either side, thus straddling mesh elements, and enabling communication therebetween. Further, winged edge structures are known and can be used in connection with the present invention. Accordingly, it is possible to produce diagrams of adapted mesh, and computed isobars for inviscid flow over an ONERA M6 wing at particular predetermined conditions, computed using an unstructured representation of the Cartesian mesh, and adapted Cartesian mesh and computed isobars for wing representations, as well as a diagram of an adapted mesh and computed isobars for inviscid flow over a high wing transport configuration with an unstructured Cartesian mesh containing 2.9M cells with 10 adaptations. It is further possible to combine unstructured data storage with a component-based surface modeling for complete aircraft geometries. Surface triangulations are CAD generated and are permitted to overlap and intersect. It is possible to produce a diagram of a high wing transport configuration with a high-lift system deployed, and with the mesh containing 1.65M cells at 10 levels of refinement and with the mesh presented by cutting planes at 3 spanwise locations and the cutting plane on the starboard wind being flooded by isobars of a discrete solution.

FIG. 1-17 of Appendix B is a diagram of the relationship between partitions of a search space with partition directions alternating over the keys of a search space, according to the prior art. In particular, the Figure shows the partitioning of a selected hyperspace into resulting sub-regions, to ensure that the children of each node contain the same amount of objects. The tree accordingly remains balanced, even when the data is non-uniformly distributed in the search space. For each node in the tree, the location of the partition associated with it is stored. The tree holds the maximum amount of data at every level, and is therefore not as deep as an unbalanced tree of the same number of objects. As a result, fewer operations are required when the tree is used to retrieve data.

FIG. 1-18 of Appendix B is a diagram of the construction of an ADT for a data set with 5 points in a two dimensional hyperspace. In particular, the Figure shows an ADT built for data with two search keys. Each point in the data set is linked to the tree node which is used to store it. According to a well-known algorithm, a list of objects falling within a specified target range is returned. According to one embodiment of the present invention, the ADT is used for finding intersection candidates between finite sized objects. Accordingly, a Cartesian bounding box of a finite sized object in d dimensions is defined as the smallest Cartesian region which can contain the object.

FIG. 1-19 of Appendix B are diagrams of Cartesian bounding boxes according to a number of predetermined embodiments for use according to the present invention. In particular, the Figure shows examples for planar and 3-D objects.

FIG. 1-20 of Appendix B is a diagram of inside, outside, and intersected triangles in a predetermined domain cut by a boundary. In particular, the FIG. shows a sketch in which a set of triangles on an unstructured mesh are cut by a closed boundary. It is desired to classify the triangles in the mesh as inside or outside of the boundary. The intersected triangles have already been identified. A seed for a painting algorithm is identified by determining the status of one of the unclassified triangles. The seed triangle is classified by a full query evaluation and is painted according to the result, to indicate its classification. Using this triangle as the starting point, the seed triangle paints each of its non-intersected and unclassified neighbors with its own status. In turn, each of these triangles then recursively passes the result to its non-intersected and unpainted neighbors.

FIG. 2-2 of Appendix B is a diagram of surface triangulations for two intersecting teardrop shaped bodies, with the labels indicating regions painted by a single seed. In particular, the Figure shows two closed surface triangulations which intersect tip-to-tail.

FIG. 2-1 of Appendix B is a diagram of component-based Cartesian mesh generation, with and without removal of internal geometry. In particular, the Figure shows the presence of internal geometry, causing intersection of a component boundary by a body-cut Cartesian mesh cell. A cell may be completely encased within a component. Before being rejected from the mesh, the cell is tested for such containment.

FIG. 2-2 of Appendix B is a diagram of selected geometric degeneracies in two and three dimensions. In particular, the Figure shows degeneracies such as improper intersection, colinearity, and coplanarity.

FIG. 2-3 of Appendix B is a diagram of an intersecting pair of generally positioned triangles in three dimensions. In particular, the Figure shows a view of two intersecting triangles, with each intersecting triangle-triangle pair contributing one segment to the final polyhedron which comprises the wetted surface of the configuration. With the task of intersecting a particular triangle reduced to an intersection test between that triangle and those on the list of candidates provided by the ADT, the intersection problem is re-cast as a series of tri-tri intersection computations. The Figure shows a view of two intersecting triangles as a model for discussion. Each intersecting tri-tri pair will contribute one segment to the final polyhedra that will comprise the wetted surface of the configuration. The assumption of data in general (as opposed to arbitrary) position implies that the intersection is always non-degenerate. Triangles may not share vertices, and edges of tri-tri pairs do not intersect exactly. Thus, all intersections will be proper. This restriction will be lifted in later sections with the introduction of an automatic tie-breaking algorithm.

FIG. 2-4 of Appendix B is a diagram of the implementation of a slope-pierce test on a selected edge against a triangle under test. In particular, the Figure checks for the intersection of a particular edge through a selected triangle. According to one approach, the intersection p of the segment with the triangle is evaluated for containment by verifying the same sign in each of three cross-products. A conventional implementation of this approach has failures, as p falls near the edges or vertices of the triangle.

FIG. 2-5 of Appendix B is a diagram of a Boolean test used in connection with the present invention to check whether a particular edge crosses a plane defined by a tested triangle, through computation of the signed volumes of two tetrahedra. In particular, the Figure shows that if a and b are established on opposite sides of the plane. It is thus determined whether segment ab pierces within the boundary of the triangle. This only occurs if the three tetrahedra formed by connecting the endpoints of ab with the endpoints of the three edges of the triangle 012 all have the same sign.

FIG. 2-6 of Appendix B is a diagram of a Boolean test for the piercing of a particular line segment with the boundary of a triangle under test. In particular, the Figure illustrates a case in which all of the three volumes are positive. After determining the existence of all the segments which result from intersections between tri-tri pairs and connecting a linked list of all such segments to the triangles that intersect to produce them, all that remains is to actually compute the locations of the pierce points. This is accomplished by using a parametric representation of each intersected triangle and the edge which pierces it.

FIG. 2-7 of Appendix B is a diagram of a parametric representation of a line defined by its endpoints and a plane defined by the vertices of a selected triangle in 3-D. Once a pierce point has been established to exist, a constructor is designed to generate the actual geometry of the pierce point.

FIG. 2-8 of Appendix B is a diagram of respective configurations of intersecting cubes, and a wireframe showing intersection with segments linked to triangles. In particular, the Figure shows a configuration of two intersecting cubes, as well as a wire-frame intersection of the cubes shown in highlighted form.

FIG. 2-9 of Appendix B is a diagram of the decomposition of an intersected triangle using a constrained Delaunay triangulation algorithm, with the constraining segments shown as heavy solid lines. In particular, the Figure shows intersected triangles linked to 3 segments. The segments divide the intersected triangle into polygonal regions which are either completely inside or outside of the body. In order to remove the portions of these triangles which are inside, these polygonal regions are triangulated within each intersected triangle, permitting rejection of the triangles which lie completely inside the body. The final result of the intersection step is a list of segments linked to each intersected triangle. These segments divide the intersected triangles into polygonal regions which are either completely inside or outside of the body. In order to remove the portions of these triangles which are inside, we triangulate these polygonal regions within each intersected triangle and then reject the triangles which lie inside the body. The Figure shows a typical intersected triangle divided into two polygonal regions with the segments resulting from the intersection calculation highlighted. In the sketch, the two polygonal regions formed by the triangle's boundary and the segments from the intersection have been decomposed into sets of triangles. Since the segments may cut the triangle arbitrarily, a pre-disposition for creating triangles with arbitrarily small angles exists. In an effort to keep the triangulations as well behaved as possible, we employ a two dimensional Delaunay algorithm within each original intersected triangle. Using the intersection segments as constraints, the algorithm runs within each intersected triangle, producing new triangles which may be uniquely characterized as either inside or outside of the configuration. A variety of approaches to constructing the Delaunay triangulation of a planar graph exist. However, since each triangulation to be constructed starts with the three vertices of the original intersected triangle, the incremental algorithm of Green and Sibson is appealing. Starting with the three vertices defining the original triangle, the pierce points are successively inserted into the evolving triangulation. After all the pierce points are inserted, the constraints are enforced using a simple recursive edge swapping routine.

FIG. 2-10 of Appendix B is a Voronoi diagram of a predetermined set with 35 sites. In particular, the Figure shows 35 sites having regions surrounding the sites identifying locations in a plane which are closer to that site than to any other site in a set.

FIG. 2-11 of Appendix B is a diagram of a Voronoi triangulation of a set of 35 sites as shown in the immediately preceding Figure. Each triangulation to be constructed starts with the three vertices of the original intersected triangle.

FIG. 2-12 of Appendix B is a diagram of a demonstration of a swap operation which exchanges the diagonal of the quadrilateral. In particular, the Figure shows identification of an edge to be swapped, and identification of the quadrilateral formed by the two triangles that share the edge. The swap operation reconfigures the quadrilateral by exchanging the diagonal. The Green and Sibson algorithm is extensively documented in the literature. Its central operation is the local application of an "incircle predicate" which determines which edges need swapping to make the triangulation Delaunay after each successive point insertion. This predicate examines the four points of a quadrilateral formed by two triangles which share a common edge. In the Figure, if the point d falls within the circle defined by (a,b,c) then the diagonal of the quad must be swapped (cb→ad). Relating this discussion to the signed volume calculation starts by recognizing that if one projects the 2D coordinates (x,y) of each point in the incircle test onto a unit paraboloid $z=x^2+y^2$ with the mapping, $$(k_x, k_y) \rightarrow (k_x, k_y, k_x^2+k_y^2)$$

with k ∈ {a,b,c,d}
then the four points of the quadrilateral form a tetrahedron in 3D, and the incircle predicate may be viewed precisely as an evalutation of the volume of this tetrahedron. If $V(T_a', b',c',d')>0$ then point d lies within the circle defined by (a,b,c) and the edge cb must be swapped to da for the triangulation to be Delaunay.

FIG. 2-13 of Appendix B is a diagram of a Green and Sibson Delaunay triangulation algorithm. The algorithm begins with the intersected triangle which is to be retriangulated. A next site p is inserted and a triangle abc is located which contains the site. The new site is connected with the vertices of the triangle which contains it, by adding three edges pa, pb, and pc. These edges are incident upon p, and the original edges ac, ba, and cb are suspect. FIG. 2-14 of Appendix B is a diagram of incircle testing for a selected point z for containment within the circumcircle of p,q,r with z being contained and the diagonal of the quadrilateral pqzr being swapped. In particular, the Figure shows the application of an incircle predicate to the suspect edges. If the test point falls within the circle, the diagonal of the quadrilateral is swapped. Upon swapping, new suspect edges are identified on the boundary of the quadrilateral which are tested, thus propagating the incircle test through the mesh. For enforcement of constraining segments through edge deletion and retriangulation, a particular constraining segment is in the set of edges of the triangle. If it is not, then the edges it crosses are recursively swapped until the edge becomes an edge in the triangulation. The edges for a segment that intersects are removed and another is inserted. The vacant polygons on either side of the segment are then retriangulated. After constraint enforcement, each intersected triangle is decomposed into small triangles which lie entirely inside or outside of the wetted surface of the triangulation. Accordingly, it is possible to produce a diagram of decomposition of intersected triangles into triangles which lie completely inside or outside of the indicated configuration.

FIG. 2-17 of Appendix B is a diagram of retriangulation within a large fuselage triangle pierced by a wing leading edge component with significantly higher resolution, the 52 indicated segments describing the intersection of the leading edge constraining the triangulation. In particular, the Figure shows an example of retriangulation applied within a single large fuselage triangle that has been intersected by a wing leading edge. Since the wing leading edge has much higher resolution requirements, its triangulation is substantially more refined. In all, 52 segments from the wing leading edge constrain the triangulation. Accordingly, it is possible to produce a diagram of constrained Delaunay retriangulation of intersected triangles for four intersecting teardrop bodies, e.g. a 3-D example of four intersecting teardrop bodies. The constrained Delaunay triangulations are shown with heavy lines.

FIG. 2-18 of Appendix B is a diagram of point-in-polygon testing using the (left) winding number and the (right) ray-casting approaches. In particular, FIG. 31 shows the testing of point q for containment within polygon P. A winding number is computed by completely traversing the closed boundary P from the position of an observer at q, keeping a running total of signed angles between successive polygonal faces. Ray casting is simpler computationally. Computation of a winding number involves floating point computation of small angles, which is prone to round off errors. The intersection and constrained triangulation routines of the two preceding sections have resulted in a set of triangles which may now be uniquely classified as either internal or exposed on the wetted surface of the configuration. The only step left is then to delete those triangles which are internal to the configuration. This is a specific application of the classic "A point in polyhedron" problem for which we adopt a ray-casting approach. This method fits particularly well within the framework of proximity testing and primitive geometric computations. Simply stated, we determine if a point $p=(p_0,p_1,p_2)$ is within the $i^{th}$ component of a configuration $\Omega_i$ if a ray, r, cast from p intersects the closed boundary $\Omega_1$ an odd number of times. The preceding two sections demonstrated that both the intersection and triangulation algorithms could be based upon Boolean operations checking the sign of the 3×3 determinant, and the same is true for the ray casting step. Assuming that r is cast along a coordinate axis (+x for example) it may be truncated just outside the +x face of the bounding box for the entire configuration $\lceil \partial\Omega \rceil_x$. This ray may then be represented by a line segment from the test point $(p,p_1,p_2)$ to $(\lceil \partial\Omega \rceil_x+\epsilon, p_1,p_2)$ and the problem reduces to a proximity query and the segment-triangle intersection algorithm. The ADT returns the list of intersection candidates while the logical tests check for intersections. Counting the number of such intersections determines a triangle's status as inside or outside. To avoid casting as many rays as there are triangles, a "painting algorithm" allows each tested triangle to pass on its status to the three triangles which share its edges. The algorithm then recurses upon the neighboring triangles until a constrained edge is encountered at which time it stops. In this way the entire configuration is "painted" using very few ray casts. The recursive algorithm is implemented using a stack to avoid the associated overhead. Accordingly, it is possible to produce a diagram of ray casting combined with mesh painting with three internal regions shown identified and painting with one ray per region, e.g. ray casting and painting with 3 teardrop bodies. Component triangulation can be shown in wireframe, and three internal regions can be painted. Each internal region can be seeded with a single ray cast, and filled in with the painting algorithm.

FIG. 2-24 of Appendix B is a diagram of unshaded triangles using a 3×3 form of a simplex determinant without incurring round-off error due to the initial subtraction of coordinate data. In particular, the Figure shows an example of surface triangulation on a teardrop shaped body. Triangles for which floating-point subtraction of their vertices is not exact are shaded. To ensure accurate and robust computation according to the present invention, an orientation test is computed using data in floating point form. Further, the maximum round-off error bound is computed for the floating point evaluation. Next, if the absolute magnitude of the signed volume from the orientation test is less than the error bound, the orientation test is recomputed using exact, adaptive precision floating point arithmetic.

FIG. 2-25 of Appendix B is a diagram of an expression tree for a 2-D orientation predicate. In particular, the Figure shows a list of approximate and true values in an expression tree for evaluation of a determinant used to derive an error bound for a 2-D form of the orientation test. Each true term is expressed as an approximate term and an associated error term. Accordingly, the correctness of a sign determination is guaranteed mathematically.

FIG. 2-26 of Appendix B is a diagram of an expression tree for three dimensional orientation, for computation of the signed volume of a tetrahedron, Tabcd. In particular, the Figure illustrates derivation of an error bound for this predicate. If the magnitude of the signed volume is less than a determined maximum value, then the predicate is determined using exact arithmetic. The signed volume computation for arbitrarily positioned geometry can return a result which is positive (+1), negative (−1) or zero (0), where ±1 are non-degenerate cases and zero represents some geometric degeneracy. Implementation of this predicate, however, can be tricky, since it requires that we distinguish round-off error from an exact zero. Such considerations usually lead practitioners to implement the predicate with exact (arbitrary precision) arithmetic or with strictly integer math. Unfortunately, while much hardware development has gone into rapid floating point computation, few hardware architectures are optimized for either the arbitrary precision or integer math alternatives. In an effort to perform as much of the computation as possible on the floating-point hardware, we first compute in floating point, and then make an a-posteriori estimate of the maximum possible value of the round-off error, $\epsilon_{REmax}$. If this error is larger than the computed signed volume, then the case is considered indeterminate and we invoke the adaptive precision exact arithmetic procedure developed by Shewchuk. If the case turns out to be identically zero, we then resolve the degeneracy with a general tie-breaking algorithm based on a virtual perturbation approach. An error bound, $\epsilon_{REmax}$, is computed for floating point computation of the 3×3 determinant. The derivation accounts not only for the error in computing the determinant, but also for the error associated with floating point computation of the bound itself. This bound may be expressed as:

$$\epsilon_{REmax} = (7\epsilon + 56\epsilon) \circledcirc (\alpha_A \oplus \alpha_B \oplus \alpha_C)$$

with:

$$\alpha_A = |a_2 \ominus d_2| \otimes (|b_0 \ominus d_0| \otimes (c_1 \ominus d_1)| \oplus |(b_1 \ominus d_1) \otimes (c_0 \ominus d_0)|)$$
$$\alpha_B = |b_2 \ominus b_2| \otimes (|c_0 \ominus d_0| \otimes (c_1 \ominus d_1)| \oplus |(c_1 \ominus d_1) \otimes (a_0 \ominus d_0)|)$$
$$\alpha_C = |c_2 \ominus d_2| \otimes (|a_0 \ominus d_0| \otimes (b_1 \ominus d_1)| \oplus |(a_1 \ominus d_1) \otimes (b_0 \ominus d_0)|),$$

where the circle (○) overstrike on +,−, and × indicates that the operations are evaluated using floating point operations on IEEE 754 compliant hardware. $\epsilon$ is precisely $\epsilon = 2^p$ where p is the number of bits of the significand used by the machine. p may be evaluated by determining the largest exponent for which $1.0 \oplus 2^{-p} = 1.0$ when the sum and equality are tested with floating point. On most 32-bit platforms with exact rounding p=53 for double precision and p=24 for single. In practice, only a very small fraction of the determinant evaluations fail.

FIG. 2-27 of Appendix B is a diagram of real and perturbed configurations for degeneracy breaking, with perturbations applied only to the vertical x1 coordinate, for clarity. In particular, FIG. 35 shows an example of a perturbation applied to a ray-casting determination in 2-D. A ray cast from point 5 intersected improperly with segments 36, 47, 78, and 12, and is colinear with 64 and 81. By applying a perturbation according to the present invention, the indicated degeneracies are resolved as shown. Accordingly, point 6 is perceived as being below the line as point 6', resulting in a tie-breaking effect. With degenerate geometry identified by the exact arithmetic routines, we can now remove the restriction imposed by the initial assumption that all input geometric data lie in general position. The richness of possible degeneracies in three dimensions cannot be overstated, and without some systematic method of identifying and coping with them, handling of special cases can permeate, or even dominate the design of a geometric algorithm. Simulation of Simplicity (SoS) is one of a category of general approaches to degenerate geometry known generically as "virtual perturbation algorithms". The basic premise is to assume that all input data undergoes a unique, ordered perturbation such that all ties are broken (i.e. data in special position is perturbed into general position). When a tie is encountered, we rely on the perturbations to break the tie. Since the perturbations are both unique and constant, any tie in the input geometry will always be resolved in a topologically consistent manner. Since the perturbations are virtual, no given geometric data is ever altered. The perturbation $\epsilon(i,j)$ at any point is a function of the point's index, $i \in \{0, 1, \ldots, N-1\}$ and the coordinate direction, $j \in \{1, \ldots, d\}$. According to the present invention, a perturbation of the following form is used:

$$\epsilon(i, j) = \epsilon \text{ where } \begin{array}{l} 0 \leq i \leq N-1 \\ 1 \leq j \leq d \\ \delta \geq d \end{array}$$

This choice indicates that the perturbation applied to $i_j$ is greater than that on $k_i$ iff (i<k) or (i=k) $\hat{0}$ (j>1). To illustrate, consider the following two-dimensional version of the simplex determinant.

$$det[M] = det\begin{pmatrix} a_0 & a_1 & 1 \\ b_0 & b_1 & 1 \\ c_0 & c_1 & 1 \end{pmatrix}$$

If the points a,b,c are assumed to be indexed with i=0, 1, 2 respectively, then taking $\delta=2$ produces a perturbation matrix with:

$$\Lambda = \begin{pmatrix} \epsilon^{2^{-1}} & \epsilon^{2^{-2}} & 1 \\ \epsilon^{2^{2-1}} & \epsilon^{2^{2-2}} & 1 \\ \epsilon^{2^{4-1}} & \epsilon^{2^{4-2}} & 1 \end{pmatrix}$$

Taking the determinant of the perturbed matrix $M_{\hat{0}} = M + \hat{0}$ yields:

$$det[M_\Lambda] = det[M] + \epsilon^{1/4}(-b_0 + c_0) +$$
$$\epsilon^{1/2}(b_1 - c_1) + \epsilon^1(a_0 - c_0) +$$
$$\epsilon^{3/2}(1) + \epsilon^2(-a_1 + c_1) +$$
$$\epsilon^{9/4}(-1) + \text{higher order terms.}$$

Since the data, a,b,c span a finite region in 2-space, intuitively one can always choose a perturbation small enough such that increasing powers of $\epsilon$ always lead to terms with decreasing magnitude. If det[M] ever evaluates to an exact zero, the sign of the determinant will be determined by the sign of the next significant coefficient in the $\epsilon$ expansion. If the next term also yields an exact zero, we continue checking the signs of the coefficients until a non-zero term appears.

FIG. 2-28 of Appendix B is a diagram of two improperly intersecting right parallelepipeds with degeneracies resolved using virtual perturbations and exact arithmetic, respectively showing the components before intersection showing degeneracy, and the result after degeneracy and tie-breaking. In particular, the Figure shows large and small cubes abutting exactly. By tie breaking with virtual perturbations in accordance with the present invention, as well as computing the intersection, retriangulating, and extracting the wetted surface, the degeneracy is resolved. The virtual perturbation scheme according to the present invention, resolved not only the coplanar degeneracy, but all improper edge-edge intersections, resulting in a proper overlap of the two polyhedra. The exact arithmetic and tie breaking routines according to the present invention provide a robust intersection algorithm including intersection, triangulation, and raycasting, even in the case of degeneracies.

FIG. 3-3 of Appendix B is a diagram of a list of triangles associated with children of a cut-cell, which is obtained according to the present invention, using ADT, or by exhaustively searching over the parent cell's triangle list. In particular, FIG. 37 shows the passing of a parent cell's triangle list to its children. The triangles describe the wetted surface of a selected configuration. When a cell is subdivided, a child cell inherits the triangle list of its parent. As the mesh subdivision continues, the triangle lists connected to a surface intersecting (i.e., cut) Cartesian cell will get shorter by approximately a factor of 4 with each successive subdivision. According to the present invention, it becomes successively computationally advantageous to conduct searches over a cell's triangle list for intersection rather than performing ADT.

FIG. 3-4.a and FIG. 3-4.b of Appendix B are a diagram of a measurement of the maximum angular variation within a cut-cell i. In particular, they show the determination of an internal angular variation value, based upon a surface normal vector, within each cut cell. These additionally provide a diagram of a measurement of the angular variation between adjacent cut-cells. In particular, they show determination of a cell-to-cell angular average variation value. The respective internal and cell-to-cell angular variation values are used according to the present invention to determine whether to tag cut cells for geometric refinement. When the angles are identically zero, all the cut cells will be tagged for refinement. When they are 180 degrees, only those cells at sharp cusps will be tagged.

FIG. 3-5 of Appendix B is a diagram of the effect of varying angle threshold on number of cells produced after refinement of three different configurations. In particular, the Figure shows the sensitivity of the refinement to variation of parameters for angles from zero to 180 degrees, for three configurations. All surface intersecting Cartesian cells in the domain are initially automatically refined a specified number of times $(R_{min})_j$. By default this level is set to be 4 divisions less than the maximum allowable number of divisions $(R_{max})_j$ in each direction. When a cut cell is tagged for division, the refinement is propagated several (usually 3–5) layers into the mesh using a "buffering" algorithm which operates by sweeps over the faces of the cells. Further refinement is based upon a curvature detection strategy. This is a two-pass strategy which first detects angular variation of the surface normal, ñ, within each cut cell and then examines the average surface normal behavior between two adjacent cut cells. Taking k as a running index to sweep over the set of triangles, $T_i$, $V_j$ is the $j^{th}$ component of the vector subtraction between the maximum and minimum normal vectors in each Cartesian direction.

$$V_j = \max(n_{k_j}) \forall (k \in T_i)$$

The min(–) and max(–) are performed over all elements of $T_i$. The angular variation within cell i is then simply the direction cosines of $\overline{V}$:

$$\cos(\theta_{i,j}) = \frac{\max(n_{k_j}) - \min(n_{k_j})}{\overline{V}}$$

Similarly, $(\phi_j)_{r,s}$ measures the $J^{th}$ component of the angular variation between any two adjacent cut cells r and s. With $\hat{n}_i$ denoting the unweighted unit normal vector within any cut cell i, the components of are:

$$\cos(\phi_j)_{r,s} = \frac{|n_{j_r} - n_{j_r}|}{|\hat{n}_r - \hat{n}_s|}$$

If $\theta_j$ or $\phi_j$ in any cell exceeds an angle threshold (usually set to 25°) the offending cell is tagged for subdivision in direction j.

FIG. 3-7 of Appendix B is a diagram of a Cartesian mesh with predetermined total divisions in each direction discretizing using the region from x0 to x1. In particular, the Figure illustrates the integer coordinate numbering scheme according to the present invention, in three dimensions. FIG. 40 shows a model Cartesian mesh covering the region $[\overline{x}_0, \overline{x}_1]$. Every cell in such a mesh can be uniquely located by the integer coordinates $(i_0, i_1, i_2)$ which correspond to the vertex closest to $\overline{x}_0$. If we allocate m bits of memory to store each integer $i_j$, the upper bound on the permissible total number of vertices in each coordinate direction is $2^m$. On a mesh with $N_j$ prescribed nodes, performing $R_j$ cell refinements in each direction will produce a mesh with a maximum integer coordinate of $2^{R_j}(N_j - 1) + 1$ which must be resolved in m bits.

$$2^{R_j}(N_j-1)+1 \leq 2^m$$

Thus, the maximum number of cell subdivisions that may be performed in each direction is $$(R_{max})_j = \lfloor \log_2(2^m-1) - \log_2(N_j-1) \rfloor$$

where the floor indicates rounding down to the next lower integer. Substituting back gives the total number of vertices which we can address in each coordinate direction.

$$M_j = 2^{R_{maxj}}(N_j-1)+1$$

Thus, $M_j$ can never exceed $2^m$.

For any cell i, is the integer position vector $(V_{0_0}, V_{0_1}, V_{0_2})$. If we also know the number of times that i has been divided in each direction, $R_j$, we can express its other 7 vertices directly.

$$\overline{V}_1 = \overline{V}_0 + (\ 0,\ 0,\ 2^{Rmax_2-R_2})$$

$$\overline{V}_2 = \overline{V}_0 + (\ 0,\ 2^{Rmax_1-R_1},\ 0)$$

$$\overline{V}_3 = \overline{V}_0 + (\ 0,\ 2^{Rmax_1-R_1},\ 2^{Rmax_2-R_2})$$

$$\overline{V}_4 = \overline{V}_0 + (2^{Rmax_0-R_0},\ 0,\ 0)$$

$$\overline{V}_5 = \overline{V}_0 + (2^{Rmax_0-R_0},\ 0,\ R^{Rmax_2-R_2})$$

$$\overline{V}_6 = \overline{V}_0 + (2^{Rmax_0-R_0},\ 2^{Rmax_1-R_1},\ 0)$$

$$\overline{V}_7 = \overline{V}_0 + (2^{Rmax_0-R_0},\ 2^{Rmax_1-R_1},\ 2^{Rmax_2-R_2})$$

Since the powers of two in this expression are simply a left shift of the bitwise representation of the integer subtraction $Rmax_j - R_j$, vertices $V_1 - V_7$ can be computed from $V_0$ and $R_j$ at very low cost. In addition, the total number of refinements in each direction will be a (relatively) small integer, thus its possible to pack all three components of $\overline{R}$ into a single 32-bit word.

FIG. 3-9 of Appendix B is a diagram of a general interior cell and first and second models for surface cut-cells. In particular, the Figure shows that at wall boundaries, Cartesian cells are cut arbitrarily by the body geometry. The volume of each cut-cell which is inside the flow is computed by subtracting out the volume of the cell which protrudes into the wall.

FIG. 3-10 of Appendix B is a diagram of a cut-cell in the abstract. In particular, the Figure shows the cut-cell linked to a set of four triangles which comprise the small swatch of the configuration's surface triangulation intersected by the cell.

FIG. 3-11 of Appendix B is a diagram of an outcode and a facecode setup for a coordinate aligned region in two dimensions. In particular, FIG. 43 shows a two dimensional Cartesian cell covering a selected region. Particular points p-v are assumed vertices of the cells candidate triangle list. Each vertex is assigned an outcode associated with its location with respect to the cell. A central algorithm of any Cartesian mesh generation strategy involves testing the surface for intersection with the Cartesian cells. While the general edge-triangle intersection algorithm would provide one method of testing for such intersections, a more attractive alternative comes from the literature on computer graphics. This algorithm is highly specialized for use with coordinate aligned regions, and while it could be extended to non-Cartesian cells, or even other cell types, its speed and simplicity would be compromised. Since rapid cut-cell intersection is an important part of Cartesian mesh generation, we present a few central operations of this algorithm in detail. More particularly, FIG. 43 shows a two dimensional Cartesian cell c which covers the region $[\bar{c},\bar{d}]$. The points (p, q, . . . ,v) are assumed to be vertices of c's candidate triangle list $T_c$. Each vertex is assigned an "outcode" associated with its location with respect to cell c. This boolean code has 2 bits for each coordinate direction. Since the region is coordinate aligned, a single inequality must be evaluated to set each bit in the outcode of the vertices. Using the operators & and | to denote bitwise applications of the □ and" and "or" boolean primatives, candidate edges (like rs) can be trivially rejected if outcode$_r$ & outcode$_s \neq 0$ Similarly, since outcode$_t$ |outcode$_v$=0, the segment must be completely contained. If all the edges of a triangle, like tuv, cannot be trivially rejected, then there is a possibility that it intersects the 0000 region. Such a polygon can be tested against the face-planes of the region by constructing a logical bounding box (using a bitwise "or") and testing against each facecode of the region. In FIG. 45, testing facecode$_j$ & (outcode$_t$ |outcode$_u$ |outcode$_v$)

∀j∈(0, 1, 2, . . . , 2d-1)

results in a non-zero only for the 0100 face. When an intersection point, such as p' or t' is computed, it can be classified and tested for containment on the boundary of $[\bar{c}, \bar{d}]$ by examination of its outcode. However, since these points lie degenerately on the 01XX boundary, the contents of this bit may not be trustworthy. For this reason, we mask out the questionable bit before examining the contents of these outcodes. Applying "not" in a bitwise manner yields:

(outcode$_p$, & ⌐facecode$_1$))=0, while (outcode$_t$, & ⌐facecode$_1$))≠0, which indicates that t' is on the face, while p' is not.

FIG. 3-12 of Appendix B is a diagram of a divide-and-conquer strategy according to the prior art of Sutherland-Hodgman, with respect to polygon clipping, as a series of steps in which a polygon is clipped against a succession of infinite edges. In particular, the Figure shows a process for an arbitrary polygon clipped against a rectangular window.

FIG. 3-13 of Appendix B is a diagram of a setup for clipping a candidate triangle against a coordinate aligned region, including extraction of the clipped triangle. In particular the Figure illustrates clipping for generating triangle-polygons. Accordingly, it is possible to produce a diagram of triangle-polygons on the surface of a high wing transport configuration resulting from the intersection of body-cut Cartesian cells with surface triangulation, with the triangle-polygons being triangulated and showing approximately 500000 body-cut Cartesian cells. Accordingly, it is possible to produce a diagram of respective representations including cutting planes through a 4.72M cell Cartesian mesh, and a close-up of the mesh near the outboard nacelle, for a proposed supersonic transport design. Accordingly, it is possible to produce a diagram of the cutting planes through a mesh of multiple aircraft configurations with 5.61M cells and 683000 triangles in the triangulation of the wetted surface, showing portions of multiple cutting planes through a selected geometry, including for example a cutting plane at the tail of the rear two aircraft, or just under the helicopter geometry.

The detailed description of the preferred embodiments includes appendices A and B attached hereto and incorporated herein by reference in their entirety. More specifically, appendices A and B are as follows:

Appendix A is M. J. Aftosmis, M. J. Berger, J. E. Melton, *Robust and Efficient Cartesian Mesh Generation for Component-Based Geometry*, 35$^{th}$ AIAA Aerospace Sciences Meeting and Exhibit, Jan. 6–9, 1997 (attached hereto and incorporated in the entirety.

Appendix B is M. J. Aftosmis, *Solution Adaptive Cartesian Grid Methods for Aerodynamic Flows with Complex Geometries*, Lecture notes for 28$^{th}$ Computational Fluid Dynamics Lecture Series, von Karman Institute for Fluid Dynamics, Mar. 3–7, 1997 (attached hereto and incorporated herein in the entirety).

What is claimed is:

1. A computer implemented method for determining the intersection of selected component geometries where each component is described by a triangulated surface, comprising:

locating triangle intersection candidates with a fast spatial search;

performing floating point filtering of geometric primitives by evaluating associated determinants in comparison with calculated error bounds, to determine whether an exact arithmetic determination of the determinants is necessary in view of the result of an evaluation being less than the error bound;

resolving degeneracies by virtual perturbation; and identifying regions and minimizing ray casting by traversing connected regions.

2. The method according to claim 1 wherein said alternative digital tree data structure is stored in a selected computer memory.

3. The method according to claim 1 wherein filtering includes making floating point error estimates to determine which floating point operations are to be computed exactly.

4. The method according to claim 1 wherein adaptive precision software is used for unambiguous computation of geometric primitives.

5. The method according to claim 1 wherein a degeneracy is resolved unambiguously.

6. The method according to claim 1 wherein a degeneracy is resolved using a simulation of simplicity technique according to one embodiment.

7. The method according to claim 1 wherein regions are identified using painting.

8. The method according to claim 1 wherein ray casting is minimized using painting.

9. A method of grid generation for Cartesian volume grids in three dimensions with embedded boundaries using a computer, comprising:

performing a rapid triangle Cartesian cell intersection;

employing an integer coordinate system in a multilevel Cartesian grid;

using bitmasks for uniquely locating selected features of a cell;

using outcodes for rapid intersection of segments of triangles and cells;

matching split cells in adjacent polyhedra by testing adjacent Cartesian edge fragments for overlap; and identifying polyhedra in split cells.

10. The method according to claim 9 wherein performance of a rapid triangle Cartesian cell intersection includes using an alternating digital tree data structure.

11. The method according to claim 9 wherein said integer coordinate system is compressed.

12. The method according to claim 9 including constraining selected features of a cell.

13. The method according to claim 9 wherein said selected features are selected from a group of features including points, faces, edge, and corners.

14. The method according to claim 9 wherein said polyhedra are identified using painting.

15. The method of determining intersection of components described by triangulations in a selected configuration, comprising:

performing a proximity search;

conducting primitive geometric operations;

performing adaptive precision exact arithmetic; and breaking geometric degeneracies.

16. The method according to claim 15 wherein performance of a proximity search includes determining a list of triangles on components which may intersect with a triangle on a polyhedron under consideration.

17. The method according to claim 16 wherein at least a single triangle from said list is compared for intersection with a triangle on a polyhedron under consideration.

18. The method according to claim 17 including performing signed volume tests on tetrahedrons constructed from said at least a single triangle and said triangle on a polyhedron.

19. The method according to claim 15 including extracting the wetted surface of the intersected components.

20. In both ray casting and Boolean triangle-to-triangle intersection evaluations, the method comprising:

performing floating point filtering;

performing exact arithmetic; and performing virtual perturbation.

21. The method according to claim 20 including performing simulation of simplicity evaluation.

22. The method according to claim 20 including evaluating the determinant of a matrix.

23. A system for determining the intersection of selected component geometries where each component is described by a triangulated surface, comprising:

means for locating triangle intersection candidates with fast spatial search;

means for performing floating point filtering of geometric primitives by evaluating associated determinants in comparison with calculated error bounds, to determine whether an exact arithmetic determination of the determinants is necessary in view of the result of an evaluation being less than the error bound;

means for resolving degeneracies by virtual perturbation; and means for identifying regions and minimizing ray casting by traversing connected regions.

24. The system according to claim 23 wherein said alternative digital tree data structure is stored in a selected computer memory.

25. The system according to claim 23 wherein filtering includes making floating point error estimates to determine which floating point operations are to be computed exactly.

26. The system according to claim 23 wherein adaptive precision software is used for unambiguous computation of geometric primitives.

27. The system according to claim 23 wherein a degeneracy is resolved unambiguously.

28. The system according to claim 23 wherein a degeneracy is resolved using a simulation of simplicity technique according to one embodiment.

29. The system according to claim 23 wherein regions are identified using painting.

30. The system according to claim 23 wherein ray casting is minimized using painting.

31. A system of generation for Cartesian volume grids in three dimensions with embedded boundaries, comprising:

means for performing a rapid triangle Cartesian cell intersection;

means for employing an integer coordinate system in a multilevel Cartesian grid;

means for using bitmasks for uniquely locating selected features of a cell;

means for using outcodes for rapid intersection of segments of triangles and cells;

means for matching split cells in adjacent polyhedra by testing adjacent Cartesian edge fragments for overlap; and means for identifying polyhedra in split cells.

32. The system according to claim 31 wherein performance of a rapid triangle Cartesian cell intersection includes using an alternating digital tree data structure.

33. The system according to claim 31 wherein said integer coordinate system is compressed.

34. The system according to claim 31 including constraining selected features of a cell.

35. The system according to claim 31 wherein said selected features are selected from a group of features including points, faces, edge, and corners.

* * * * *